(12) United States Patent
Ryan et al.

(10) Patent No.: US 6,405,103 B1
(45) Date of Patent: Jun. 11, 2002

(54) BUILDING CONTROL SYSTEM

(75) Inventors: Thomas M. Ryan, Bushkill, PA (US); James M. Ryan, Fairfax, VA (US); Louis A. Santiago, Bushkill, PA (US)

(73) Assignee: Comfort Systems, Inc., E. Stroudsburg, PA (US)

( * ) Notice: Subject to any disclaimer, the term of this patent is extended or adjusted under 35 U.S.C. 154(b) by 0 days.

(21) Appl. No.: 09/216,245

(22) Filed: Dec. 18, 1998

(51) Int. Cl.⁷ ............................................... G05B 13/00
(52) U.S. Cl. ............................. 700/275; 700/2; 700/83; 700/19; 707/200
(58) Field of Search .............................. 700/2, 19, 95, 700/275, 276, 277, 299; 707/200, 102; 340/825.06, 825.07

(56) References Cited

U.S. PATENT DOCUMENTS

| | | |
|---|---|---|
| 4,212,078 A | 7/1980 | Games et al. ................... 700/2 |
| 4,784,212 A | 11/1988 | Brimer et al. ............... 165/240 |
| 5,364,024 A | 11/1994 | Lin ........................... 236/44 C |
| 5,385,297 A | 1/1995 | Rein et al. .................. 236/49.3 |
| 5,435,147 A | 7/1995 | Mochizuki et al. ............ 62/175 |
| 5,491,649 A | 2/1996 | Friday, Jr. et al. .......... 700/276 |
| 5,764,155 A * | 6/1998 | Kertesz et al. ............... 700/295 |
| 5,768,119 A * | 6/1998 | Havekost et al. ............... 700/4 |
| 5,909,368 A * | 6/1999 | Nixon et al. .................... 700/2 |

OTHER PUBLICATIONS

Wonderware Factory Suite Intouch, Wonderware Corporation, User's Guide, Dec. 1997.*

* cited by examiner

Primary Examiner—Leo P. Picard
Assistant Examiner—Sheela S. Rao
(74) Attorney, Agent, or Firm—Sheldon & Mak

(57) ABSTRACT

Disclosed is a system for controlling appliances of at least one building, each appliance being associated with a local controller and having a control input and at least one control point. The system includes a central processor computer having an operator interface and an equipment interface, a network connected to the equipment interface and having a plurality of nodes for communicating with each of the appliances, a log file being stored with respective area, description, and address fields containing corresponding data of the control points. A control program in the computer feeds the equipment interface to drive the control inputs of the appliances in response to a database, the database being populated from a tagname dictionary. A conversion program produces the tagname dictionary as a transfer file, the program including instructions for accessing the area, description, and address fields of the log file, generating for each point a tagname as a concatenation of the area and description fields, and an item including contents of the address field, and storing the tagnames and associated items with the header in the transfer file, whereby the system drives the control inputs of the appliances in response to the control point data of the log file. The conversion program can include a mode selector for directing conditional, unconditional and test modes of a utility process populating the database. Also disclosed is a process for controlling multiple appliances of at least one building.

11 Claims, 2 Drawing Sheets

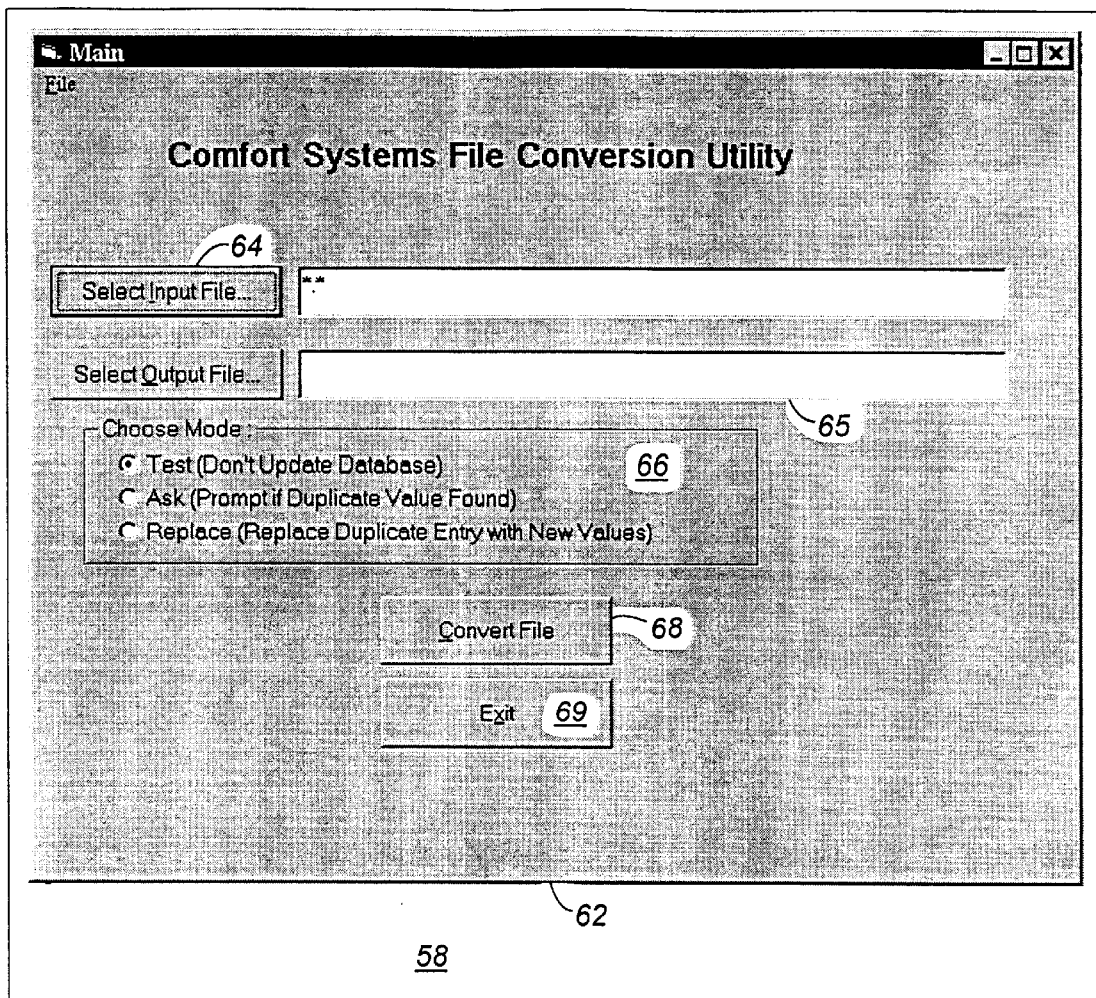
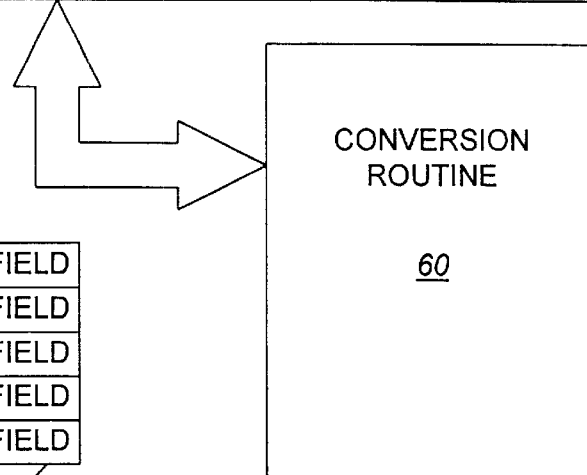
Fig. 2.
Fig. 3.

BUILDING CONTROL SYSTEM

BACKGROUND

The present invention relates to environmental control and monitoring of buildings, and more particularly to systems for controlling and monitoring manufacturing, heating, air conditioning, lighting, data processing, security, emergencies and the like, in installations that can include multiple types of existing equipment in distributed as well as local sites.

U.S. Pat. No. 5,491,649 to Friday, Jr, et al. discloses a system for adapting a generally written HVAC control program to a number of HVAC systems that can have different numbers of fans and compressors in respective chiller units, using separate configuration data for each unit. U.S. Pat. No. 5,385,297 discloses an air distribution system having wireless communication between air distribution controllers and zone temperature sensors of plural control zones, the system including zone lighting controls. U.S. Pat. No. 5,364,024 to Lin discloses a portable temperature and humidity controller having a switched power outlet that is selectively powered in response to a temperature sensor or a humidity sensor. U.S. Pat. No. 4,784,212 to Brimer et al. discloses an adaptive controller for building perimeter heating and cooling systems of different types. U.S. Pat. No. 4,212,078 to Games et al. discloses a computer controlled facility management system for controlling various combinations of air conditioning systems in plural buildings, wherein the systems of each building can vary as to manufacturer, age, and type of system. The above-identified systems of the prior art exhibit a number of disadvantages. For example:

1. They are difficult to expand in that changing technology is likely to render additional compatible components unavailable;
2. They are difficult to maintain in that changing technology is likely to render compatible replacement components unavailable;
3. They are incompatible with many existing and installed control components; and
4. They are difficult and expensive to install, requiring extensive labor of highly skilled technicians.

The control of distributed systems such as building systems has been undertaken in connection with commonly used computer networks and business software. For example, an application known as InTouch™ permits graphical objects or symbols representing distributed control points of a system to be associated by tagnames, thereby facilitating operator-supervised and unattended control of the system using a computer having a network interface to devices containing the control points. Although the InTouch™ application program operates in well known and widely used graphically oriented operating systems (Windows 9x and Windows NT), a manual process of "tagging" must be performed in order to configure the system. Tagging consists of taking each "point" within a site, and manually creating a tagname entry within InTouch™. The tagname data dictionary contains all information about the variables being used in the application. Each entry needs to contain information such as the tagname and the item. The tagname is a name a human would understand whereas an item is something that the system or hardware must understand. Currently the manual process involves using the InTouch™ application screens and a data entry form to create the tagname database. This tagging process is tedious, time-consuming, and is prone to errors.

Thus there is a need for a system for controlling multiple distributed devices having variant technologies and characteristics that overcomes the disadvantages of the prior art.

SUMMARY

The present invention meets this need by providing a multiple appliance control system including a link module for producing a tagname dictionary transfer file for feeding a database population process using control point parameter data contained in respective area, description, and address fields of a log file, the log file also having a header and additional data fields. In one aspect of the invention, the link module is a computer program including instructions for accessing the area, description, and address fields; instructions for generating for each point a tagname as a concatenation of the area and description fields, and an item comprising contents of the address field; instructions generating an output header; and instructions for storing the tagnames and associated items with the header as the transfer file to be read by the process.

The computer program can further include instructions for defining a graphical interface for receiving operator input. The operator input can include an input and/or output file path definitions.

Preferably the operator input includes a mode selection for directing the database population process, the program further including means for inserting a mode batch instruction into the transfer file in response to the mode selection. The mode selection can include a conditional mode wherein changes to existing database records are conditioned on further operator input, and an unconditional mode wherein database records are stored without regard to previously stored data. Preferably the mode selection further includes a test mode for verifying the tagnames and associated data without changing records of the database.

In another aspect of the invention, a process for controlling appliances of at least one building using the computer program includes the steps of:
 (a) connecting the appliances to a computer having an interface for driving control inputs of the appliances and for receiving data from respective control points of the appliances;
 (b) forming the log file by storing respective area, description, and address data for the control points;
 (c) operating the program for producing and storing the transfer file;
 (d) populating a control database using the transfer file; and
 (e) controlling the appliances by feeding the control inputs thereof in response to values of the database.

The process can include the further steps of:
 (a) in the step of operating the program, receiving an operator selection of mode;
 (b) inserting a mode batch instruction in the transfer file; and
 (c) conditioning the step of populating in response to the mode batch instruction.

In a further aspect of the invention, a system for controlling appliances of at least one building, each appliance being associated with a local controller and having a control input and at least one control point, includes a central processor computer having an operator interface and an equipment interface; a network connected to the equipment interface and having a plurality of nodes for communicating with each of the appliances; means for storing a log file having respective area, description, and address fields containing corresponding data of the control points; a control program in the computer for feeding the equipment interface to drive the control inputs of the appliances in response to a database; means for populating the database from a tagname dictionary; and a conversion program for producing the tagname dictionary as a transfer file, the program including instructions for accessing the area, description, and address fields of the log file; instructions for generating for each point a tagname as a concatenation of the area and description fields, and an item comprising contents of the address field; and instructions for storing the tagnames and associated items with the header in the transfer file, whereby the system drives the control inputs of the appliances in response to the control point data of the log file.

The means for populating the database can include a batch processing utility, the conversion program further including instructions for defining a graphical interface for receiving operator input, the operator input including a mode selection for directing the database population process, including a conditional mode wherein changes to existing database records are conditioned on further operator input, and an unconditional mode wherein database records are stored without regard to previously stored data; and instructions for inserting a mode batch instruction into the transfer file for directing the batch processing utility in response to the mode selection.

DRAWINGS

These and other features, aspects, and advantages of the present invention will become better understood with reference to the following description, appended claims, and accompanying drawings, where:

FIG. 2 is a pictorial diagram of a transfer file that is produced and stored in the control system of FIG. 1; and FIG. 3 is a pictorial block diagram of a link module of the control system of FIG. 1, the link module producing the transfer file of FIG. 2.

DESCRIPTION

Figure 1:
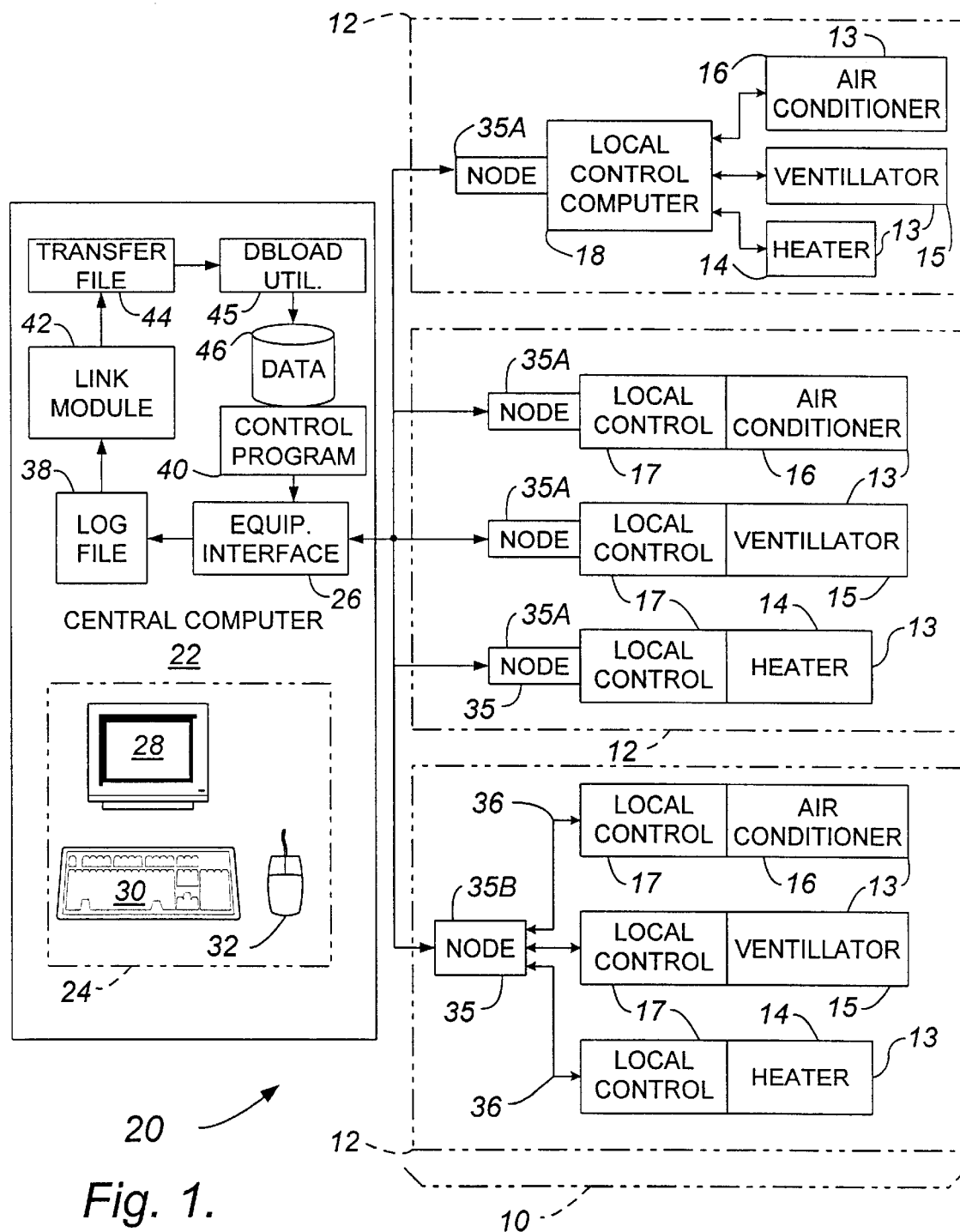
FIG. 1 is a pictorial diagram of a building control system according to the present invention.

The present invention is directed to a building control system that is particularly effective in a variety of single and multiple structures having a variety of existing heating, ventilating and air conditioning equipment. With reference to FIGS. 1–3 of the drawings, a building array 10 includes a plurality of structures 12 that each can have a plurality of control components 13 including heaters 14, ventilators 15, and air conditioning units 16. Some or all of the components can have a separate local controller 17 associated therewith; similarly, some or all of the components 13 within one of the structures 12 can be interfaced to a single local control computer 18 as shown in FIG. 1.

According to the present invention, a control system 20 includes a central processor 22 that has an operator interface 24 and an equipment interface 26 for monitoring and controlling the heaters 14, ventilators 15, and air conditioning units 16. The operator interface 24 includes a graphic display 28, a keyboard 30, and a mouse or other suitable pointing device 32 as further shown in FIG. 1. Suitable hardware for the processor 22 and the operator interface 24 is commercially available in a variety of forms commonly known as personal computers (PCs), the processor 22 typically operating on 32-bit words and having random access memory (RAM) of 32 megabytes (MB) more or less and on-line disk memory of 2 gigabytes (GB) more or less. In an exemplary implementation, the processor 22 is activated under an operating system having a graphical user interface (GUI), a suitable operating system being a current implementation of the Windows NT® operating system that is available from Microsoft Corp. of Redmond, Wash.

The equipment interface 24 is adapted for signaling and monitoring a wide variety of devices having variant circuitry that can be installed in any or all of the structures 12. Preferably the interface 24 is connected to the control devices components 13 through a suitable NetBIOS compatible communications network 34. The network 34 has at least one node 35 in each of the structures 12. As shown in FIG. 1, some of the control devices can be interfaced to the network 34 by corresponding singular nodes 35A, whereas an optional branch node 35B has separate branch connections 36 to a plurality of the control components 13. It will be understood that the network 34 can be implemented with commercially available network components and software, such a network suitable for distances up to 1000 meters being known as Ethernet and characterized by IEEE standard 802.3. Other NetBIOS compatible networks are suitable, being available in a variety of configurations, the particular configuration being chosen with regard to physical separations of the structures 12 and the equipment interface 26. It will be understood that portions of the network 34 can include commercial telephone links.

Associated with the interface 24 is wired and/or stored information about variables used in the system 20 with respect to various "points" within the control components 13, the information being downloadable into the processor 22 as a log file 38. Also, the processor 22 is implemented with a control program 40 for presenting appropriate graphical representations of the status of the various controlled devices and responding to user input to the keyboard 30 and the pointing device 32 as prompted by the display. A suitable implementation of the control program 40 is available as the InTouch™ package from Wonderware Co., of Irvine, Calif. The InTouch™ control program 40 requires properly formatted data based on the above identified variables. A principal feature of the present invention is that the system 20 further includes the processor 22 having a link module 42 being a conversion program that produces a tagname dictionary transfer file 44. As further described below, the transfer file 44 is configured for feeding a DBLoad utility 45 that is provided with the InTouch control program 40 to populate a tagname database 46 of the control program 40 itself.

Technical Implementation

1. Input

The log file 38, created by a download of data from the control components 13 through the equipment interface 26, contains a great deal of information about the components. However, the link module 42 accesses only relevant portions of the file 38. The log file 38 contains a tagname definition section that has three relevant fields -Area, Description, and Address. The relevant section of an exemplary input log file is shown below in Table 1, being representative of input data for the link module 42.

TABLE 1

Sample Input File Portion

| AREA | DESC | ADDR | M | LOAD | D | 0 | | | 1 | | | 2 | | |
|------|------|------|---|------|---|----|----|----|----|----|----|----|----|----|
|      |      |      |   |      |   | ON | OF | CS | ON | OF | CS | ON | OF | CS |
| CHIL | I-S  | 1:I  | 1 | 0 | 0 | 0  | 30 | NO | 30 | 30 | NO | 30 | 0  | NO |
| OUT  | CHIL | 2-L  | 1:5 | 1 | 0 | 0 | 0 | 30 | NO | 0 | 30 | NO | 0 | 30 |
| OUT  | NW   | HEAT | 1:9 | 1 | 5 | 0 | 30 | 0 | NO | 30 | 0 | NO | 30 | 0 |
| OUT  |      |      | 1:10 | 1 | 0 | 0 | 0 | 0 | NO | 0 | 0 | NO | 0 | 0 |
| OUT  | CW   | #1   | 1:12 | 1 | 0 | 0 | 0 | 30 | NO | 0 | 30 | NO | 0 | 30 |
| OUT  | CW   | #2   | 1:13 | 1 | 0 | 0 | 0 | 30 | NO | 30 | 0 | NO | 30 | 0 |
| OUT  | SIGN | LTS  | 1:14 | 1 | 0 | 0 | 0 | 30 | NO | 0 | 30 | NO | 0 | 30 |
| IN   | FIRE | ALRM | 1:15 | 1 | 0 | 0 | 0 | 30 | NO | 0 | 30 | NO | 0 | 30 |
| OUT  | HWH  | NW2  | 1:16 | 1 | 0 | 10 | 0 | 30 | NO | 20 | 10 | NO | 20 | 15 |
| OUT  | NW1  | WL   | 2:1 | 2 | 0 | 0 | 0 | 30 | NO | 0 | 30 | NO | 0 | 30 |
| IN   | NW1  | DL   | 2:2 | 2 | 0 | 0 | 0 | 30 | NO | 0 | 30 | NO | 0 | 30 |

| AREA | DESC | ADDR | M | LOAD | D | 3 | | | 4 | | | STATUS | | |
|------|------|------|---|------|---|----|----|----|----|----|----|----|----|----|
|      |      |      |   |      |   | ON | OF | CS | ON | OF | CS | | | |
| CHIL | I-S  | 1:I  | 1 | 0 | 0 | 30 | 0 | NO | NO | 0 | NO | ON | OFF | |
| OUT  | CHIL | 2-L  | 1:5 | 1 | 0 | NO | 0 | 30 | NO | 0 | NO | ON | OFF | |
| OUT  | NW   | HEAT | 1:9 | 1 | 5 | NO | 0 | 30 | NO | 0 | 0 | NO | OFF | |
| OUT  |      |      | 1:10 | 1 | 0 | NO | 0 | 0 | NO | 0 | 0 | NO | OFF | |
| OUT  | CW   | #1   | 1:12 | 1 | 0 | NO | 30 | 0 | NO | 0 | 0 | NO | OFF | |
| OUT  | CW   | #2   | 1:13 | 1 | 0 | NO | 30 | 0 | NO | 0 | 0 | NO | OFF | |
| OUT  | SIGN | LTS  | 1:14 | 1 | 0 | NO | 0 | 30 | NO | 0 | 0 | NO | OFF | |
| IN   | FIRE | ALRM | 1:15 | 1 | 0 | NO | 0 | 30 | NO | 0 | 0 | NO | OFF | |
| OUT  | HWH  | NW2  | 1:16 | 1 | 0 | NO | 20 | 15 | NO | 0 | 0 | NO | OFF | |
| OUT  | NW1  | WL   | 2:1 | 2 | 0 | NO | 30 | 0 | NO | 0 | 0 | NO | ON | |
| IN   | NW1  | DL   | 2:2 | 2 | 0 | NO | 0 | 30 | NO | 0 | 0 | NO | ON | |

2. Conversion Program

The link module 42 generates the tagname dictionary transfer file 44 with comma-delineated fields for use by the DBLoad utility 45, as shown in FIG. 2, an exemplary form thereof being depicted in Table 2. The link module 42 takes the Area, Description, and Address information from the log file 38 and generates a tagname 48 as a concatenation of the Area and Description fields, and an item 50 being the Address downloaded. The remaining required information of the transfer file 44 is a header 52 containing batch commands, and additional field data being automatically generated from within the link module 42, the additional data being represented in FIG. 2 as a field block 54 that is interposed between the tagname 28 and the item 50, and a trailing field 56 following the item 50. Preferably the header 52 includes a batch mode instruction 57 for directing the DBLoad utility 45 in response to operator input as further described below.

TABLE 2

Sample Transfer File

:mode=ask
:DDEAccess,Application,Topic,RequestInitial,AdviseActive
"PERIMETER","HISDDE","PERIMETE",Yes,Yes
:DDEMsg,Group,Comment,Logged,EventLogged,EventLoggingPriori
ty,RetentiveValue,MaxLength,InitialMessage,DDEAccessName,It
emUseTagname,ItemName,ReadOnly
"CHIL_1-S","$System","AccessLevel",No,No,0,No,3," ","PERIMET
ER",No,"1:1",No
"CHIL_2-L","$System","AccessLevel",No,No,0,No,3," ","PERIMET
ER",No,"1:5",No
"NW_HEAT","$System","AccessLevel",No,No,0,No,3," ","PERIMETE
R",No,"1:9",No
"CW_#1","$System","AccessLevel",No,No,0,No,3," ","PERIMETER"
,No,"1:12",No
"CW_#2","$System","AccessLevel",No,No,0,No,3," ","PERIMETER"

TABLE 2-continued

Sample Transfer File

,No,"1:13",No
"SIGN_LTS","$System","AccessLevel",No,No,0,No,3," ","PERIMET
ER",No,"1:14",No
"FIRE_ALRM","$System","AccessLevel",No,No,0,No,3," ","PERIME
TER",No,"1:15",No
"HWH_NW2","$System","AccessLevel",No,No,0,No,3," ","PERIMETE
R",No,"1:16",No
"NW1_WL","$System","AccessLevel",No,No,0,No,3," ","PERIMETER
",No,"2:1",No
"NW1_DL","$System","AccessLevel",No,No,0,No,3," ","PERIMETER
",No,"2:2",No The resulting transfer file 44 is then used to load the tagname database 46 of the control program 40. A preferred environment for developing the link module 42 is a high-level graphics-oriented language such as Visual Basic (available from Microsoft Crop.), which facilitates development of a simple and easy to use, Windows based configuration of the operator interface 24. This also provides great flexibility in configuring automatic data flow in applications of the system 20 having multiple sites and multiple data file organization.

Program Design

As shown in FIG. 3, the link module 42 includes a user interface 58 and a conversion routine 60, exemplary and preferred configurations of both being written using Microsoft Visual Basic 5.0. The link module 42 is configured for 32 bit mode only and therefore runs on either Microsoft Windows 95 or later, or Microsoft Windows NT 3.5 or later. The user interface 58 forms a graphical main input screen 62 as shown in FIG. 3 and having respective input and output file selectors 64 and 65 for receiving input and output file selections being corresponding paths typically to the log file 38 and the transfer file 44 to be generated therefrom, a mode selector 66 for setting the batch mode instruction 57 in the header 52 of the transfer file 44, a convert option 68 for executing the conversion routine 60, and an exit option 69 for aborting the conversion. Valid conversion modes are Test, Ask, and Replace. The selected mode is written as a batch file command as also indicated in the first line of the sample transfer file, Table 2. The Test mode can be used to test different input files 38 by generating corresponding transfer files 44 to be processed by the DBLoad utility 45 and tested by the control program 40 without actually populating the tagnames into the database 46. The Ask mode is conditional, for use when the database has been populated from an existing transfer file 44, the user being warned before any records of the database 46 are overwritten with changes. The Replace mode is used for unconditionally overwriting the database 46 with new tags.

Regarding the input and output file selectors 64 and 65, the user has several ways of entering information. For example, file names can be selected using a dialog box, or typed in directly to the prompt if the user knows the directory and the name of the file. All methods except for direct typing present a conventional open file dialog box that enables the user to navigate drives and directors until the desired file is selected. The user interface 58 handles user input through standard Microsoft controls and conforms to Microsoft Graphical User Interface standards. The interface 58 also has conventional error checking capabilities for guiding corrective action in case of wrong input.

Selection of the output file is the same as for the input file, except that the user may select an existing transfer file 44 to be overwritten with the output of the conversion process. This is the file that gets loaded into the tagname database 46 using the DBLoad utility 45 as described above. Methods to select the output file include selection from the file menu, pressing the "Select Output File . . . " button, typing Alt-O, or typing the full path and file name into the prompt. All but the direct typing method provide the user with a Save As dialog box to assist in navigation and placement of the output file. If an existing file is selected, the user is given a warning message that the file will be overwritten once conversion occurs.

The mode selector 66 is implemented as a radio button control for selecting the update mode to be used by the DBLoad utility 45 (test, ask, or replace). Only one method may be chosen per conversion. However, the process may be repeated multiple times.

Convert File can be selected either from the file menu, typing Alt+C, or by pressing the Convert File push button 68 of the main input screen 62, at which point the output file is generated by the conversion routine 60 of the link module 42 as described below.

Exit Application is selected either from the file menu, typing Alt+X, or by pressing the Exit push button 69. The link module 42 can also be exited either by using the menu bar or from a push button. Note that as a Windows compliant application, the link module 42 can be run in the background once started.

The conversion routine 60 is activated once the Convert File option is selected, proceeding generally as outlined below:

```
1.0  Procedure cmdConvert_Click
        (Called by clicking button to start conversion)
   1.1  Initialization of Variables and Constants
   1.2  Process Input and Output File Names - Validate and Open
   1.3  Read Input File
           Check for one of three valid file types
           If invalid choice Exit Procedure
   1.4  Read User Mode Choice
   1.5  Write Header Line of Output File (Mode)
   1.6  If Input File Type 1 or Type 2
   1.61    Loop Until End of Input File
              Skip until valid tag line is found
              Parse Area Description from file
              Build Area Description
              Parse Tagname Address from file
              If not Duplicate tag
                 Write Output line
                    (using info from file + Default Data)
              Read Next Line
           End Loop
   1.62    Process Last Line of Input File
              Parse Area Description from file
              Build Area Description
              Parse Tagname Address from file
              If not Duplicate tag
                 Write Output line
                    (using info from file + Default Data)
   1.7  Else Type 3 (Johnson)
           Loop Until End of Input File
              Skip Blank and non tag lines
              Parse out (skip) System field and Access Name
              Parse DDEMSg Name
              Parse and Build Item Name
              Parse Comment Line
              If not Duplicate tag
                 Write Output line
                    (using info from file + Default Data)
              Read Next Line
           End Loop
   1.8  Close Files and relate conversion status via Dialog Box
End Procedure.
```

Program Implementation

Exemplary program code of the conversion routine 60, which contains the logic for all elements of the file conversion, being attached or linked to the main input screen 62 in a conventional manner, is listed below.

```
- - - - - - - - - - - - - -
Option Explicit                                         '(1.0)
- - - - - - - - - - - - - -
Private Sub cmdConvert_Click( )                         '(68)
    Dim LFCR                                            '(1.1)
    Dim ConstTagInfo As String
    ConstTagInfo =
       "," "$System" "," "AccessLevel" ",No,No,0,No,3" " " "," " "
    'Variables for Output File
    Dim OutDDEMsg As String
    Dim OutGroup As String
    Dim OutComment As String
    Dim OutLogged As String
    Dim OutEventLogged As String
    Dim OutEventLoggingPriority As Integer
    Dim OutRetentiveName As String
    Dim OutMaxLength As Integer
    Dim OutInitialMessage As String
    Dim OutDDEAccessName as String
    Dim OutItemUseTagName as String
    Dim OutItemName As String
    Dim OutReadOnly As String
    Out DDEMsg = " "
    OutGroup = " " "$System" " "
    OutComment = " " "
    OutLogged = " " "No" " "
```

-continued

```
OutEventLogged = " " "No" " "
OutEventLoggingPriority = 0
OutRetentiveName = " " "No" " "
OutMaxLength = 131
OutInitialMessage = " " " " " "
OutDDEAccessName = " "
OutItemUseTagName = " " "No" " "
OutItemName = " "
OutReadOnly = " " "No" " "
LFCR = Chr(13) + Chr(10)
Dim FileNum
Dim FileNum2
Dim TextInfo As String
Dim DDEAccess As String
Dim NumChar As Integer
Dim Counter
Dim CharRead As String
Dim DataLine As String
Dim ValidInp As Integer
Dim ValidInp2 As Integer
Dim ValidInp3 As Integer
Dim LineLen As Integer
Dim AreaDesc As String
Dim Addr As String
Dim Temp1 As String
Dim Temp2 As String
Dim EmbSpace As Integer
Dim EmbSlash As Integer
Dim ModeString As String
Dim SystemLine As String
Dim DDEAccessNamePart1 As String
Dim DDEMsgPart1 As String
Dim DDEMsgPart2 As String
ValidInp = 0
ValidInp2 = 0
ValidInp3 = 0
DataLine = " "
ModeString = "test"
If InputFileName.Text = " " Then                         '(1.2)
   MsgBox "Please Enter an Input File Name"
   Exit Sub
Else
   NumChar = InStr(InputFileName.Text, ".")
   DDEAccess = Left(InputFileName.Text, NumChar – 1)
   'Strip PathPortion from FileName
   'Remove Additional Slashes
   Do While InStr(DDEAccess, "\") < > 0
      EmbSlash = InStr(DDEAccess, "\")
      DDEAccess = Mid(DDEAccess, EmbSlash + 1)
   Loop
End If
If OutputFileName.Text = " " Then
   MsgBox "Please Enter an Output File Name"
   Exit Sub
End If
FileNum = FreeFile
Open InputFileName.Text for Input as FileNum
Line Input #FileNum, DataLine                            '(1.3)
Do While Not EOF(FileNum) And ValidInp = 0
   'MsgBox ("DataLine = "+ DataLine)
   ValidInp = InStr(DataLine, "AREA DESC ADDR")
   Line Input #FileNum, DataLine
Loop
'Check for Second Type of Valid Input File
If EOF(FileNum) Then
   Close (FileNum)
   Open IntputFileName.Text For Input As FileNum
   Line Input #FileNum, DataLine
   Do While Not EOF(FileNum) And ValidInp2 = 0
      'MsgBox ("DataLine = " + DataLine)
      ValidInp2 = InStr(DataLine, "AREA DESC ADDR")
      Line Input #FileNum, DataLine
   Loop
End If
'Check for Third (Johnson) Type of Valid Input File
If EOF(FileNum) Then
   Close (FileNum)
   Open InputFileName.Text For Input As File Num
   Line Input #FileNum, DataLine
```

-continued

```
   Do While Not EOF(FileNum) And ValidInp3 = 0
      ValidInp3 = InStr(DataLine, "System: ")
      SystemLine = DataLine
      Line Input #FileNum, DataLine
   Loop
End If
If (ValidInp = 0 And ValidInp2 = 0 And ValidInp3 = 0) Then
   MsgBox "This is not a Valid Input File"
   Exit Sub
Else
   'Write Header Section To TextInfo                     (1.4)
   If Option1(0).Value = True Then
      ModeString = "test"
   End If
   If Option1(1).Value = True Then
      ModeString = "ask"
   End If
   If Option1(2).Value = True Then
      ModeString = "replace"
   End If
   TextInfo = ":mode=" + ModeString + LFCR               '(1.5)
   TextInfo = TextInfo +
":DDEMsg,Group,Comment,Logged,EventLogged,EventLoggingPriority,
RetentiveValue,MaxLength,InitialMessage,DDEAccessName,
ItemUseTagname,ItemName,ReadOnly" + LFCR
   'Conversion for Type 1 and Type 2 Files               (1.6)
   If ValidInp3 = 0 Then
      Do While Not EOF(FileNum.)                         '(1.61)
         LineLen = Len(DataLine)
         If LineLen > 2 Then
            'Filter out Underline Lines
            If InStr(DataLine, "____") = 0 Then
               Temp1 = Left(DataLine, 1)
               Temp2 = Asc(Temp1)
               If Temp 2 = 10 Then
                  Dataline = Mid(Dataline, 2)
                  AreaDesc = Left(DataLine, 9)
               End If
               AreaDesc = Trim(AreaDesc)
               If Len(AreaDesc) > 0 Then
                  'Check That an Area and Desc Exists
                  Addr = Mid(DataLine, 11, 5)
                  Addr = Trim(Addr)
                  'Replace Space w/ Underscore
                  EmbSpace = InStr(AreaDesc, " ")
                  'Remove Additional Spaces
                  If EmbSpace > 0 Then
                     AreaDesc = Left(AreaDesc, EmbSpace – 1) + "_"
                        + Mid(AreaDesc, EmbSpace + 1)
                  End if
                  Do While InStr(AreaDesc, " ") < > 0
                     EmbSpace = InStr(AreaDesc, " ")
                     AreaDesc = Left(AreaDesc, EmbSpace – 1)
                        + Mid(AreaDesc, EmbSpace + 1)
                  Loop
                  'Make sure Area and Desc are not already in file
                  If InStr(TextInfo, AreaDesc) = 0 Then
                     TextInfo = TextInfo + " " " " + AreaDesc + " " " " +
                        ConstTagInfo + " " + Trim(Addr) + " " ",No" +
                        LFCR
                  End If
               End If
            End If
         End If
         Line Input #FileNum, DataLine
      Loop
      'PROCESS LAST LINE OF INPUT FILE                   (1.62)
      LineLen = Len(DataLine)
      If LineLen > 2 Then
         'Filter out Underline Lines
         If InStr(DataLine, "____") = 0 Then
            Temp1 = Left(DataLine, 1)
            Temp2 = Asc(Temp1)
            If Temp 2 = 10 Then
               Dataline = Mid(Dataline, 2)
               AreaDesc = Left(DataLine, 9)
            End If
            AreaDesc = Trim(AreaDesc)
            If Len(AreaDesc) > 0 Then
```

-continued

```
        'Check That an Area and Desc Exists
            Addr = Mid(DataLine, 11, 5)
            Addr = Trim(Addr)
            'Replace Space w/ Underscore
            EmbSpace = InStr(AreaDesc, " ")
            'Remove Additional Spaces
            If EmbSpace > 0 Then
                AreaDesc = LeftAreaDesc, EmbSpace – 1) + "_"
                    + Mid(AreaDesc, EmbSpace + 1)
            End If
            Do While InStr(AreaDesc, " ") < > 0
                EmbSpace = InStr(AreaDesc, " ")
                AreaDesc = Left(AreaDesc, EmbSpace – 1)
                    + Mid(AreaDesc, EmbSpace + 1)
            Loop
            'Make sure Area and Desc are not already in file
            If Instr(TextInfo, AreaDesc) = 0 Then
                TextInfo = TextInfo + " " " " " " + AreaDesc + " " " " " +
                ConstTagInfo + " " + Trim(Addr) + " " ",No" +
                LFCR
            End If
          End If
        End If
      End If
    Else                                            '(1.7)
      'First reset DataLine to the System Line
        DataLine = SystemLine
        Do While Not EOF(FileNum)
          LineLen = Len(DataLine)
          'Filter out Blank Lines
          If LineLen > 2 Then
            'Filter out Header Lines
            If ((Instr(DataLine, "Status Item     Description")
              = 0) Or (InStr(DataLine, "Standard Summary") = 0))
            Then
              If InStr(DataLine, "System: ") Then
                'Parse Out System: from DataLine
                DataLine = Mid(DataLine, 9)
                'Parse Out AccessName
                If InStr(DataLine, "\") < > 0 Then
                  EmbSlash = InStr(DataLine, "\")
                  DDEAccessNamePart1 = Mid(DataLine, 1,
                    EmbSlash – 1)
                  OutDDEAccessName = DDEAccessNamePart1
                    + ".Read"
                  'Store First Part of DDEMsg Name
                  DDEMsgPart1 = Mid(DataLine, EmbSlash + 1)
                End If
              Else
                'Parse out Item Name (Skip Status Column)
                DDEMsgPart2 = Trim(Mid(DataLine, 10, 15))
                OutDDEMsg = DDEMsgPart1 + "\" + DDEMsgPart2
                'Parse Out Comment Line
                OutComment = Trim(Mid(DataLine, 25, 35))
                'Build ItemName
                OutItemName = DDEAccessNamePart1 + "\" +
OutDDEMsg + ".VALUE"
                'Parse Out MaxLength
                Temp1 = Trim(Mid(DataLine, 60, 14))
                If (InStr(Temp1; "0") < > 0 Or InStr(Temp1, "1")
< > 0 Or InStr(Temp1, "2") < > 0 Or InStr(Temp1, "3") <> 0 Or
Instr(Temp1, "4") < > 0 Or Instr(Temp1, "5") < > 0 Or Instr(Temp1,
"6") < > 0 Or Instr(Temp1, "7") < > 0 Or Instr(Temp1, "8") < > 0 Or
InStr(Temp1, "9") < > 0) Then
                  OutMaxLength = 131
                Else
                  If Temp1 = "ON" Then
                    OutMaxLength = 3
                  Else
                    OutMaxLength = Len(Temp1)
                  End If
                End If
                'Write the Output Line
                TextInfo = TextInfo + Chr(34) + OutDDEMsg +
Chr(34) + "," + OutGroup + "," + Chr(34) + OutComment + Chr(34) +
"," + OutLogged + "," + OutEventLogged + "," +
Trim(Str(OutEventLoggingPriority)) + "," + OutRetentiveName + "," +
Trim(Str(OutMaxLength)) + "," + OutInitialMessage + "," + Chr(34) +
OutDDEAccessName + Chr(34) + "," + OutItemUseTagName + "," +
Chr(34) + OutItemName + Chr(34) + "," + OutReadOnly + LFCR
              End If
            End If
          End If
          Line Input #FileNum, DataLine
        Loop
      End If
    End If
    Close FileNum                                 '(3.8)
    FileNum 2 = FreeFile
    Open OutputFileName.Text For Output As FileNum2
    Print #FileNum2, TextInfo
    MsgBox ("File Conversion Successful!")
    Close FileNum2
End Sub
------------------------------------------
Private Sum CmdInput_Click( )                    '(64)
    Dim Filter As String
    On Error GoTo OpenError
    Filter = "All Files (*.*) | *.*"
    CommonDialog1.Filter = Filter
    CommonDialog1.FilterIndex = 1
    CommonDialog1.filename = "*.*"
    CommonDialog1.Action = 1
    IntputFileName.Text = CommonDialog1.filename
    Exit Sub
OpenError:
    MsgBox "You canceled the dialog box!"
    Exit Sub
End Sub
------------------------------------------
Private Sub cmdOutput_Click( )                   '(65)
    Dim Filter As String
    On Error GoTo OpenError
    Filter = "All Files (*.*) | *.*"
    CommonDialog1.Filter = Filter
    CommonDialog1.FilterIndex = 1
    CommonDialog1.filename = "*.*"
    CommonDialog1.Action = 2
    OutputFileName.Text = CommonDialog1.filename
    Exit Sub
OpenError:
    MsgBox "You canceled the dialog box!"
    Exit Sub
End Sub
------------------------------------------
Private Sub Frame1_DragDrop(Source As Control, X As Single, Y As
Single)                                          '(66)
    If Option1(0).Value = True Then
        Option1(1).Value = False
        Option1(2).Value = False
    End If
    If Option1(1).Value = True Then
        Option1(1).Value = False
        Option1(2).Value = False
    End If
    If Option1(2).Value = True Then
        Option1(1).Value = False
        Option1(2).Value = False
    End If
End Sub
------------------------------------------
Private Sub mnuInput_Click( )                    '(64 alternate)
    Dim Filter As String
    On Error GoTo OpenError
    Filter = "All Files (*.*) | *.*"
    CommonDialog1.Filter = Filter
    CommonDialog1.FilterIndex = 1
    CommonDialog1.filename = "*.*"
    CommonDialog1.Action = 1
    InputFileName.Text = CommonDialog1.filename
    Exit Sub
Open Error:
    MsgBox "You canceled the dialog box!"
    Exit Sub
End Sub
------------------------------------------
Private Sub cmdExit_Click( )                     '(69)
```

-continued

```
    End
End Sub
--------------------------------------------------

Private Sub mnuExit_Click( )                '(69 alternate)
    End
    End Sub
--------------------------------------------------

Private Sub mnuOutput_Click( )              '(65 alternate)
Dim Filter As String
On Error GoTo OpenError
Filter = "All Files (*.*) | *.*"
CommonDialog1.Filter = Filter
CommonDialog1.FilterIndex = 1
CommonDialog1.filename = "*.*"
CommonDialog1.Action = 2
OutputFileName.Text = CommonDialog1.filename
Exit Sub
OpenError:
MsgBox "You canceled the dialog box!"
Exit Sub
End Sub
--------------------------------------------------
```

3. Run DBLoad Utility

The InTouch DBLoad utility 45, introduced above, reads the transfer file 44 for populating the Tagname database 46 from the transfer file 44. The utility 45 is launched with definitions of the path to the transfer file 44 and an application directory to receive the tagname data of the database 46.

After running the DBLoad Utility, the Tagname Data Dictionary is available. All tagnames can then be attached to the graphic objects or symbols within the InTouch application in a conventional manner.

Thus the conversion routine 60 of the present invention enables the control program 40 having the tagname database 46 to feed the equipment interface 26 to drive inputs of the control components 13 by the network 34 in response to control point data being stored in the log file 38 as address data in association with respective area and description fields. Accordingly, existing control programs requiring manual database population can be utilized in the building control system 10 of the present invention, greatly simplifying system development.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A computer program for producing a tagname dictionary transfer file for feeding a database population process using control point parameter data contained in respective area, description, and address fields of a log file, the log file also having a header and additional data fields, the program comprising:

(a) instructions for accessing the area, description, and address fields;
    (b) instructions for generating for each point a tagname as a concatenation of the area and description fields, and an item comprising contents of the address field;
    (c) instructions generating an output header; and
    (d) instructions for storing the tagnames and associated items with the header as a transfer file to be read by the process.

2. The computer program of claim 1, further comprising instructions for defining a graphical interface for receiving operator input.

3. The computer program of claim 2, wherein the operator input includes an input file path definition.

4. The computer program of claim 2, wherein the operator input includes an output file path definition.

5. The computer program of claim 2, wherein the operator input includes a mode selection for directing the database population process, the program further comprising means for inserting a mode batch instruction into the transfer file in response to the mode selection.

6. The computer program of claim 5, wherein the mode selection includes a conditional mode wherein changes to existing database records are conditioned on further operator input, and an unconditional mode wherein database records are stored without regard to previously stored data.

7. The computer program of claim 6, wherein the mode selection further includes a test mode for verifying the tagnames and associated data without changing records of the database.

8. A process for controlling appliances of at least one building using the program of claim 1, the process comprising the steps of:

(a) connecting the appliances to a computer having an interface for driving control inputs of the appliances and for receiving data from respective control points of the appliances;
    (b) forming the log file by storing respective area, description, and address data for the control points;
    (c) operating the program for producing and storing the transfer file;
    (d) populating a control database using the transfer file; and
    (e) controlling the appliances by feeding the control inputs thereof in response to values of the database.

9. The process of claim 8, comprising the further steps of:

(a) in the step of operating the program, receiving an operator selection of mode;
    (b) inserting a mode batch instruction in the transfer file; and
    (c) conditioning the step of populating in response to the mode batch instruction.

10. A system for controlling appliances of at least one building, each appliance being associated with a local controller and having a control input and at least one control point, the system comprising:

(a) a central processor computer having an operator interface and an equipment interface;
    (b) a network connected to the equipment interface and having a plurality of nodes for communicating with each of the appliances;
    (c) means for storing a log file having respective area, description, and address fields containing corresponding data of the control points;
    (d) a control program in the computer for feeding the equipment interface to drive the control inputs of the appliances in response to a database;
    (e) means for populating the database from a tagname dictionary; and
    (f) a conversion program for producing the tagname dictionary as a transfer file, the program comprising:
        (i) instructions for accessing the area, description, and address fields of the log file;
        (ii) instructions for generating for each point a tagname as a concatenation of the area and description fields, and an item comprising contents of the address field; and (iii) instructions for storing the tagnames and associated items with the header in the transfer file,
whereby the system drives the control inputs of the appliances in response to the control point data of the log file.

11. The system of claim 10, wherein the means for populating the database comprises a batch processing utility, the conversion program further comprising:

(a) instructions for defining a graphical interface for receiving operator input, the operator input including a mode selection for directing the database population process, including a conditional mode wherein changes to existing database records are conditioned on further operator input, and an unconditional mode wherein database records are stored without regard to previously stored date; and (b) instructions for inserting a mode batch instruction to the transfer file for directing the batch processing utility in response to the mode selection.

\* \* \* \* \*